United States Patent
Chang

(10) Patent No.: US 8,862,133 B2
(45) Date of Patent: Oct. 14, 2014

(54) METHOD AND SYSTEM FOR DETERMINATION OF WIRELESS DEVICE SPEED VIA CHANNEL QUALITY INDICATOR FADING CHARACTERISTICS

(75) Inventor: Rui Chu Chang, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 796 days.

(21) Appl. No.: 12/622,146

(22) Filed: Nov. 19, 2009

(65) Prior Publication Data

US 2011/0117915 A1    May 19, 2011

(51) Int. Cl.
*H04W 36/00* (2009.01)
*G01S 11/06* (2006.01)
*H04B 17/00* (2006.01)
*H04B 7/12* (2006.01)

(52) U.S. Cl.
CPC ............ *H04B 17/0067* (2013.01); *G01S 11/06* (2013.01); *H04B 17/0072* (2013.01); *H04B 7/12* (2013.01)
USPC ..... 455/441; 455/440; 455/456.1; 455/414.1; 455/432.1; 455/421

(58) Field of Classification Search
CPC ...... H04W 36/32; H04W 36/04; H04W 52/28
USPC ......... 455/441, 440, 456.1, 414.1, 432.1, 421
See application file for complete search history.

(56) References Cited

U.S. PATENT DOCUMENTS

| 7,065,375 B2 * | 6/2006 | Bonhomme ................... 455/506 |
| 2012/0039207 A1 * | 2/2012 | Eriksson et al. .............. 370/252 |

FOREIGN PATENT DOCUMENTS

JP    02002190769 A  *  5/2002  ............... H04B 7/26

OTHER PUBLICATIONS

TS-36.213 version 8.5.0: E-UTRAN; "Physical Layer Procedures"; Table 7.2.2-1A; p. 42; http://www.3gpp.org/FTP/Specs/html-info/36213.htm, 2008.
TS-36.213 version 8.5.0: E-UTRAN; "Physical Layer Procedures"; Section 7.2.3, p. 46; http://www.3gpp.org/FTP/Specs/html-info/36213.htm, 2008.
TS-36.304, version 8.5.0: UE; "Procedures in Idle Mode"; Section 5.2.4.3; pp. 18-22; http://www.3gpp.org/FTP/Specs/html-info/36304.htm, 2009.
TS-36.304, version 8.5.0: UE; "Procedures in Idle Mode"; Section 5.2.4.1; p. 17; http://www.3gpp.org/FTP/Specs/html-info/36304.htm, 2009.
TS-36.331 version 8.5.0: RRC; "Protocol Specification"; CQI-Reporting Configuration; p. 114; http://www.3gpp.org/FTP/Specs/html-info/36331.htm, 2009.
Korhonen, Juha, "Introduction to 3G Mobile Communications," second edition, pp. 12-13 and 25-33, 2003.

* cited by examiner

*Primary Examiner* — Nghi H Ly
(74) *Attorney, Agent, or Firm* — Baker Botts L.L.P.

(57) ABSTRACT

A method for determining the speed of a wireless device includes the steps of receiving channel quality indicator data, determining the fast fading characteristics of the received channel quality indicator data, comparing the fast fading characteristics of the received channel quality indicator data against benchmark channel quality indicator data, and determining the speed of the wireless device based on the comparison. The channel quality indicator data is indicative of the signal quality at a wireless device. The benchmark data includes fast fading characteristics.

30 Claims, 6 Drawing Sheets

METHOD AND SYSTEM FOR DETERMINATION OF WIRELESS DEVICE SPEED VIA CHANNEL QUALITY INDICATOR FADING CHARACTERISTICS

TECHNICAL FIELD OF THE INVENTION

The present invention relates generally to mobile wireless communications and, more particularly, to a method and system for determining the speed of a wireless device via channel quality indicator fading characteristics.

BACKGROUND

In wireless communications networks, several possible features such as hierarchical cell structures, frequency diversity scheduling, and frequency selective scheduling make use of the speed of a wireless device connected to the base station.

The speed of a wireless device may be useful when utilizing hierarchical cell structures. Hierarchical cell structures are a means by which a different types of cells with different coverage areas may be overlapped. A cell with a larger coverage area with relatively less capacity may overlap a cell with a smaller coverage area with relatively higher capacity. The cell with a smaller coverage area itself may overlap a cell with yet a still smaller coverage area with a relatively even higher capacity. A cell with a larger coverage area may overlap many cells with smaller coverage areas. The cell connected to a wireless device may be reselected to another cell in the hierarchy based on the capacity needs, status, or location of the device. The hierarchical cell structures may be prioritized for a wireless device being served by the structure. The prioritization may take into account the speed of the wireless device. For example, a relatively fast moving wireless device may be unable to sustain a connection while in a smaller coverage area without triggering multiple handoffs, causing performance problems. A fast moving wireless device may be assigned to cells with larger coverage areas, and slow moving wireless devices may be assigned to cells with smaller coverage areas. A related issue is that the speed determination should happen quickly, to adapt, for example, to a wireless device in car accelerating from stop and move the wireless device from a small-coverage-area to a large-coverage-area cell. Thus, determining the speed of a wireless device is useful when utilizing hierarchical cell structures.

The speed of a wireless device may also be useful when utilizing frequency diversity scheduling or frequency selective scheduling. In wireless communication, frequency diversity scheduling is a method of assigning random subcarriers to subchannels, which results allows the system to handle a wider range of conditions. Frequency selective scheduling is a method of determining the optimal subchannel on physically adjacent subcarriers to be assigned to a wireless device. Frequency selective scheduling can provide greater throughput capacity over frequency diverse scheduling, but requires more overhead.

Frequency selective scheduling is effective for slow-moving wireless devices. For wireless device speeds exceeding a certain threshold, channel conditions change too quickly for the wireless network and the wireless device to keep up. The channel condition information obtained from the sub-band Channel Quality Indicator ("CQI") reported by the wireless network becomes out-of-date by the time the wireless network actually receives packet delivery. The gain of using frequency selective scheduling disappears. For this reason, fast moving wireless devices often use frequency diversity scheduling, and slow moving wireless devices often use frequency selective scheduling. Thus, the speed of a wireless device is useful when using either frequency diversity scheduling or frequency selective scheduling.

SUMMARY

A method for determining the speed of a wireless device includes the steps of receiving channel quality indicator data, determining the fast fading characteristics of the received channel quality indicator data, comparing the fast fading characteristics of the received channel quality indicator data against benchmark channel quality indicator data, and determining the speed of the wireless device based on the comparison. The channel quality indicator data is indicative of the signal quality at a wireless device. The benchmark data includes fast fading characteristics.

In a further embodiment, an article of manufacture includes a computer readable medium and computer-executable instructions. The computer-executable instructions are carried on the computer readable medium. The instructions are readable by a processor. The instructions, when read and executed, cause the process receive channel quality indicator data, determine fast fading characteristics of the received channel quality indicator data, compare the fast fading characteristics of the received channel quality indicator data against benchmark data, and determine the speed of the device producing the channel quality indicator data based on the comparison. The benchmark data includes fast fading characteristics.

In a further embodiment, a system includes a wireless device communications network. The wireless device communications network includes a base station. The base station will receive channel quality indicator data from a wireless device, determine fast fading characteristics of the received channel quality indicator data, compare the fast fading characteristics of the received channel quality indicator data against benchmark data, and determine the speed of the wireless device based on the comparison. The benchmark data includes fast fading characteristics.

In a further embodiment, an apparatus includes a wireless device network base station. The base station will receive channel quality indicator data from a wireless device, determine fast fading characteristics of the received channel quality indicator data, compare the fast fading characteristics of the received channel quality indicator data against benchmark data, and determine the speed of the wireless device based on the comparison. The benchmark data comprising fast fading characteristics.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
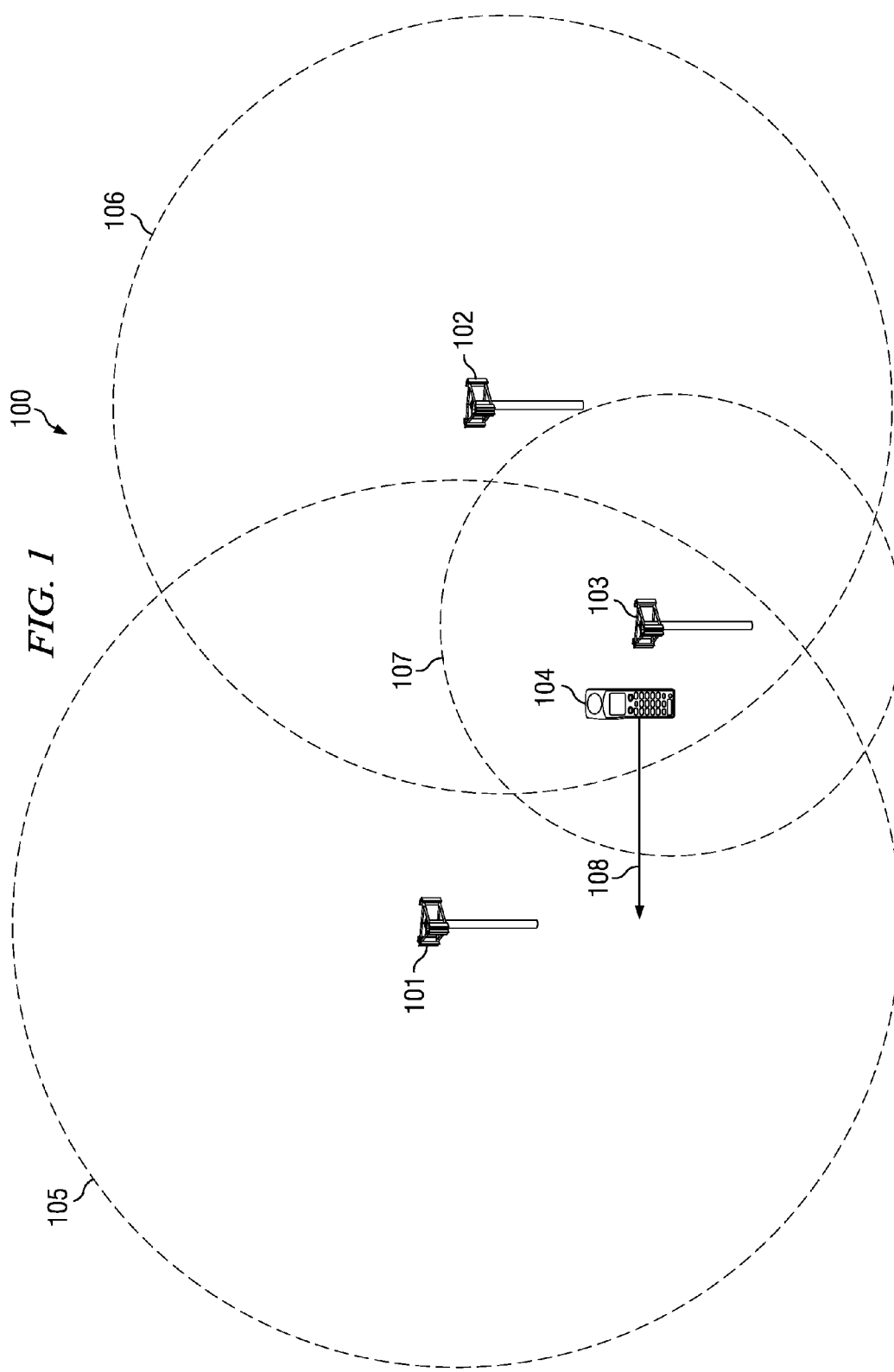
FIG. 1 is an example of a wireless communications system.

FIG. 1 is an example of a wireless communications system. Wireless communication system may be comprised of one or more base stations 101, 102, 103 and one or more wireless devices 104. Wireless communication service is provided to wireless device 104 by the one or more base stations 101, 102, 103. Base stations 101, 102, 103 may each have an associated coverage area 105, 106, 107. The size of each coverage area 105, 106, 107 will depend upon the equipment of the associated base station 101, 102, 103, as well as the geography and terrain of the local area. Base stations 101, 102, 103 are shown in relation to the center of their respective coverage areas 105, 106, 107. The center of the respective coverage areas 105, 106, 107 correspond to the broadcast antennas of the base station (not shown). However, the actual base station 101, 102, 103 may be some distance from their respective broadcast antennas. Each base station may provide different levels of service in terms of coverage area and capacity. Base station 103 may have a smaller coverage area 107 than base station 101 (coverage area 105), but it may provide additional capacity for an area with higher capacity demand, while being cheaper to deploy than base station 101. Wireless device 104 may be moving in a particular direction with a velocity 108. As illustrated, wireless device 104 may be within the coverage area of multiple base stations. Numerous protocols exist for communication between wireless device 104 and base stations 101, 102, 103. The determination of which protocol to use, as well as which base station 101, 102, 103 should be in communication with wireless device 104 may depend upon the velocity 108 of the wireless device.

Figure 2:
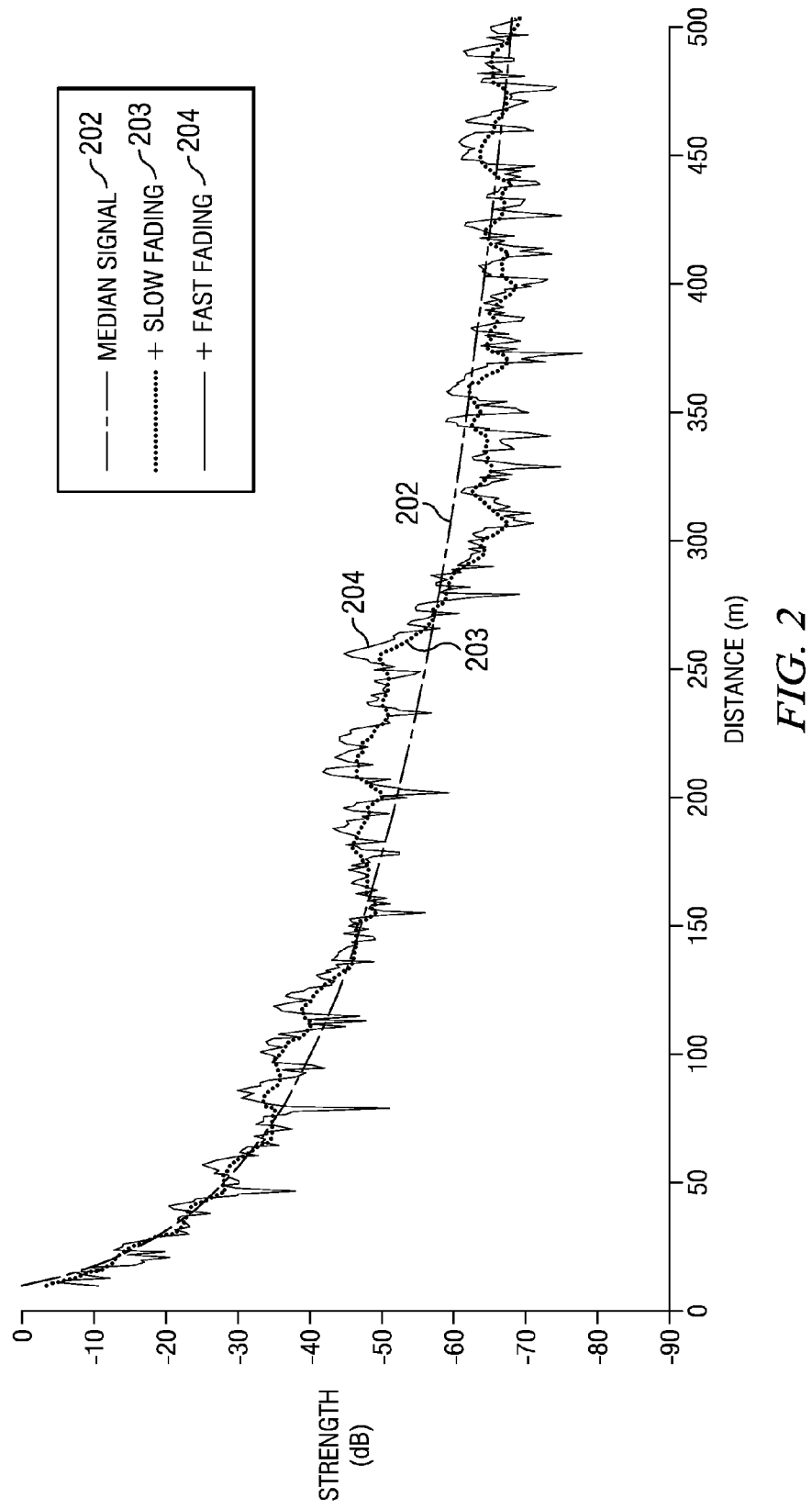
FIG. 2 is an illustration of the signal level fluctuations in a typical mobile wireless environment.

FIG. 2 is an illustration of the signal level fluctuations in a typical mobile wireless environment. The median signal 202 represents the median signal strength seen by a wireless device 104 as its distance from the broadcast antenna of base station 101 increases. The primary factor in the decrease of the median signal strength is loss caused by the distance separating the broadcast antenna of base station 101 and the wireless device 104. Two kinds of fluctuations are also shown, slow fading 203 and fast fading 204. Slow fading 203 may be caused by the shadowing effect produced from terrain or large objects such as buildings. The size of the shadows can range from a few to hundreds of meters, depending upon the size of the object. Fast fading 204 may be caused by reflections from local scatters. Reflections from in-phase multipaths may add together, increasing the total strength of the signal; reflections from opposite-phase multipaths may subtract and thus reduce the total strength of the signal. As a result, the signal fluctuates and the peak-to-peak length is approximately half a wavelength of the transmitted signal.

Figure 3A:
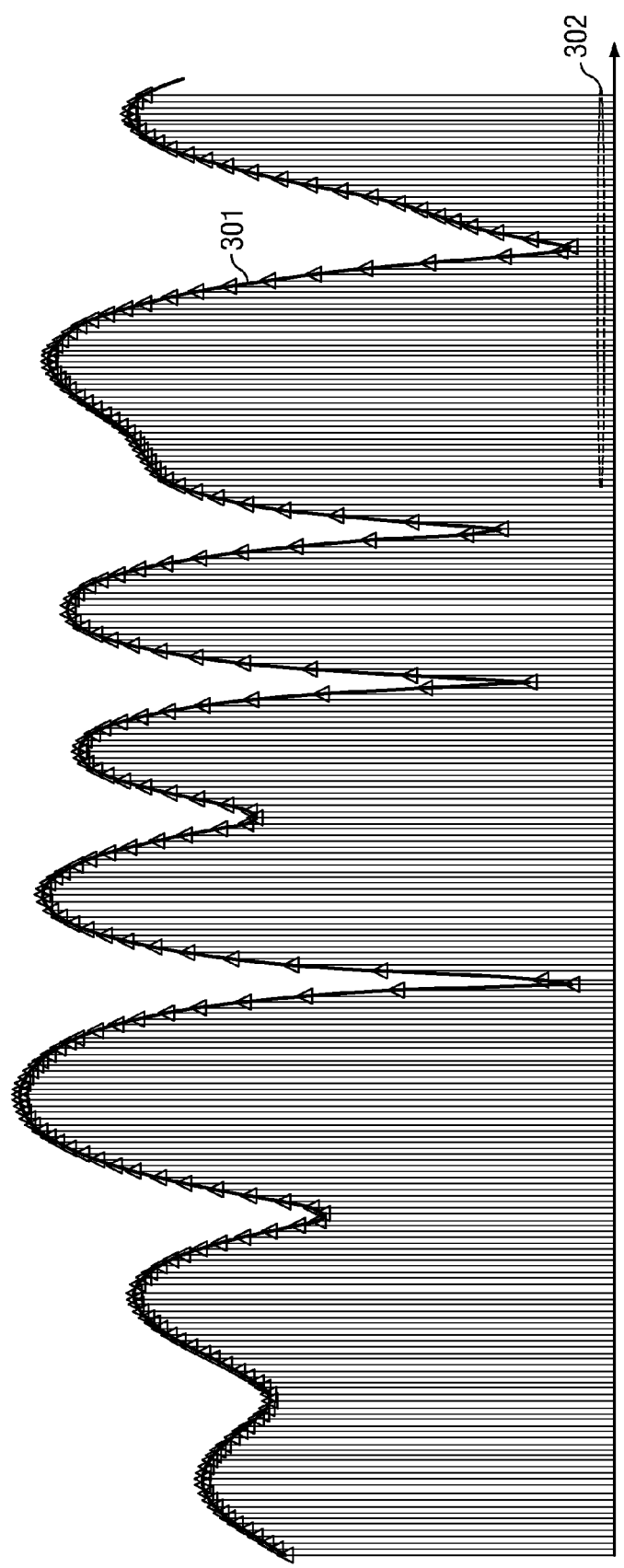
FIG. 3a is an illustration of the tracking of fast fading for wireless devices travelling at approximately 5 kilometers per hour.
Figure 3B:
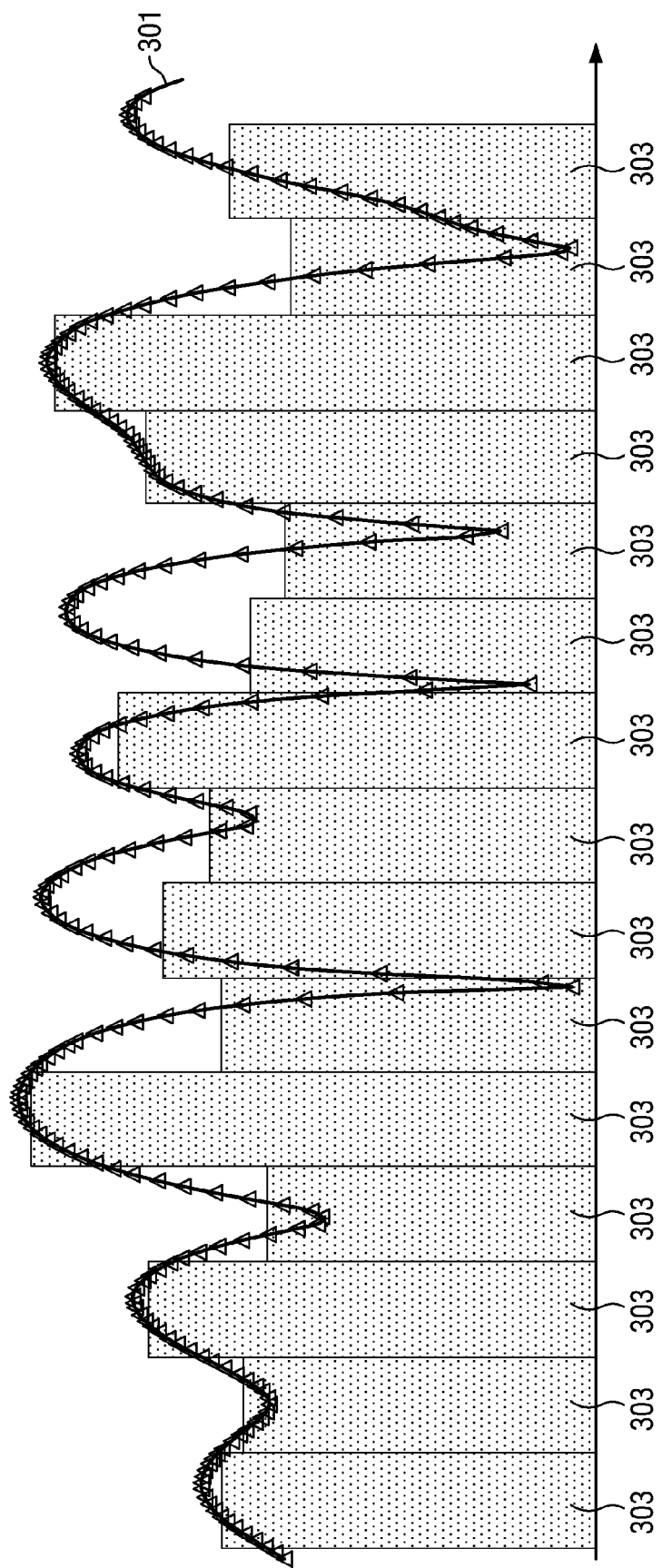
FIG. 3b is an illustration of the tracking of fast fading for wireless devices travelling at approximately 30 kilometers per hour.
Figure 3C:
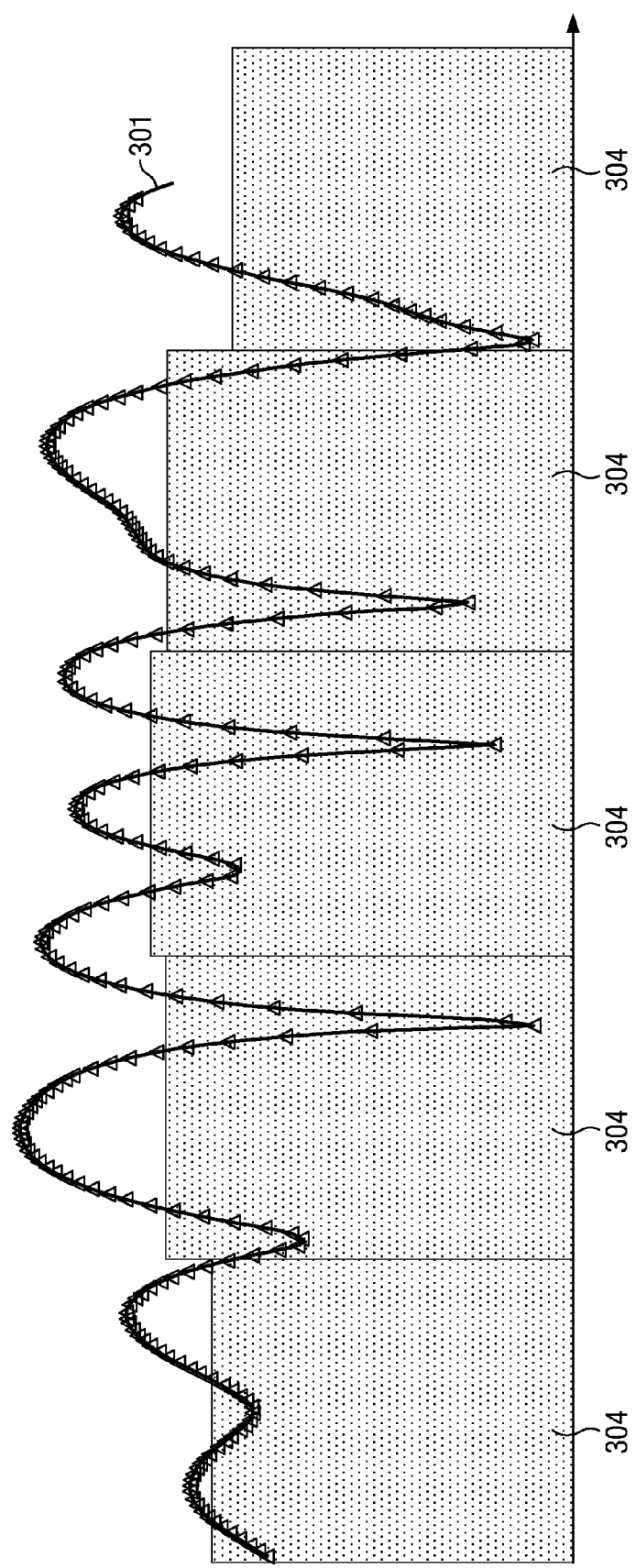
FIG. 3c is an illustration of the tracking of fast fading for wireless devices travelling at approximately 120 kilometers per hour.

FIGS. 3a, 3b, and 3c are illustrations of the measuring and tracking of fast fading for different speeds of wireless devices, given signal frequencies and Channel Quality Indicator ("CQI") update intervals. The strength and quality of the wireless signal may be collected by the wireless device 104 and reported to base station 101 via CQI data.

For slow-moving vehicles, both fast power control techniques (used in Code Division Multiple Access ("CDMA") or Universal Mobile Telecommunications System ("UMTS") protocols) or fast rate control techniques (used in 1× Evolution Data-Optimized ("1×EV-DO"), High Speed Packet Access ("HSPA"), or Long-Term Evolution ("LTE") protocols) can accurately track fast fading 204. This information is collected via the CQI from the wireless device 104. However, when the speed of the vehicle exceeds a certain threshold, fast fading 204 can no longer be accurately tracked. In this case, the strength of the signal will start to more closely resemble slow fading 203. Fast fading 204 can no longer be accurately tracked at high speeds because fast fading 203 will change more quickly than the wireless device 104 can measure CQI data. The wireless device 104 needs to receive approximately four updates per half wavelength of fast fading 204 to accurately track the sinusoidal aspects of fast fading 204 and avoid aliasing.

FIGS. 3a, 3b, and 3c each illustrate the ability of a wireless communications system to track fast fading at different speeds. For the purposes of the examples in FIGS. 3a, 3b, and 3c, a 2.1 gigahertz ("GHz") carrier signal and a CQI feedback update interval of 2 milliseconds is assumed. These values may differ in various wireless communications systems.

In FIG. 3a, a signal 301 with fast fading behavior is broadcast to a wireless device 104 moving at approximately 5 kilometers per hour. In the 2 millisecond CQI update interval, the wireless device 104 moved approximately 0.00278 meters. Within a half-wavelength of the 2.1 GHz carrier signal, the wireless device 104 made approximately 25 CQI measurements 302. The CQI measurements 302 form an accurate representation of signal 301 with fast fading behavior, and the CQI feedback In FIG. 3b, the signal 301 with fast fading behavior is broadcast to a wireless device 104 moving at approximately 30 kilometers per hour. In the 2 millisecond CQI update interval, the wireless device 104 moved approximately 0.017 meters. Within a half-wavelength of the 2.1 GHz carrier signal, the wireless device 104 made approximately 4 CQI measurements 303. The CQI measurements 303 form a less accurate representation of signal 301 with fast fading behavior than did the previous CQI measurements 302 when the wireless device was travelling 5 kilometers per hour.

In FIG. 3c, the signal 301 with fast fading behavior is broadcast to a wireless device 104 moving at approximately 120 kilometers per hour. In the 2 millisecond CQI update interval, the wireless device 104 moved approximately 0.67 meters. Within a half-wavelength of the 2.1 GHz carrier signal, the wireless device 104 made approximately one CQI measurement 303. CQI measurements 304 are insufficient to form an accurate representation of signal 301 with fast fading behavior.

As illustrated in FIGS. 3a, 3b, and 3c, the ability to track fast fading behavior decreases as the wireless device 104 moves faster, and the resulting CQI measurements are much smoother and flatter as they begin to more closely approximate slow-fading behavior.

As stated previously, the ability to track a signal 301 with fast fading behavior depends upon the speed of the wireless device 104, the CQI update interval, and the frequency of the carrier signal. It may also depend upon the specific wireless communications equipment as well as local terrain and geography.

The present invention contemplates that a correlation can be made between the relative smoothness of a set of CQI data and the speed of the wireless device generating the CQI data. The smoother the CQI data, and the more closely the CQI data tracks slow-fading behavior and not fast fading behavior, the faster the wireless device is moving. On the other hand, the more erratic the CQI data, and the more closely the CQI data tracks fast fading behavior, the slower the wireless device is moving.

Figure 4:
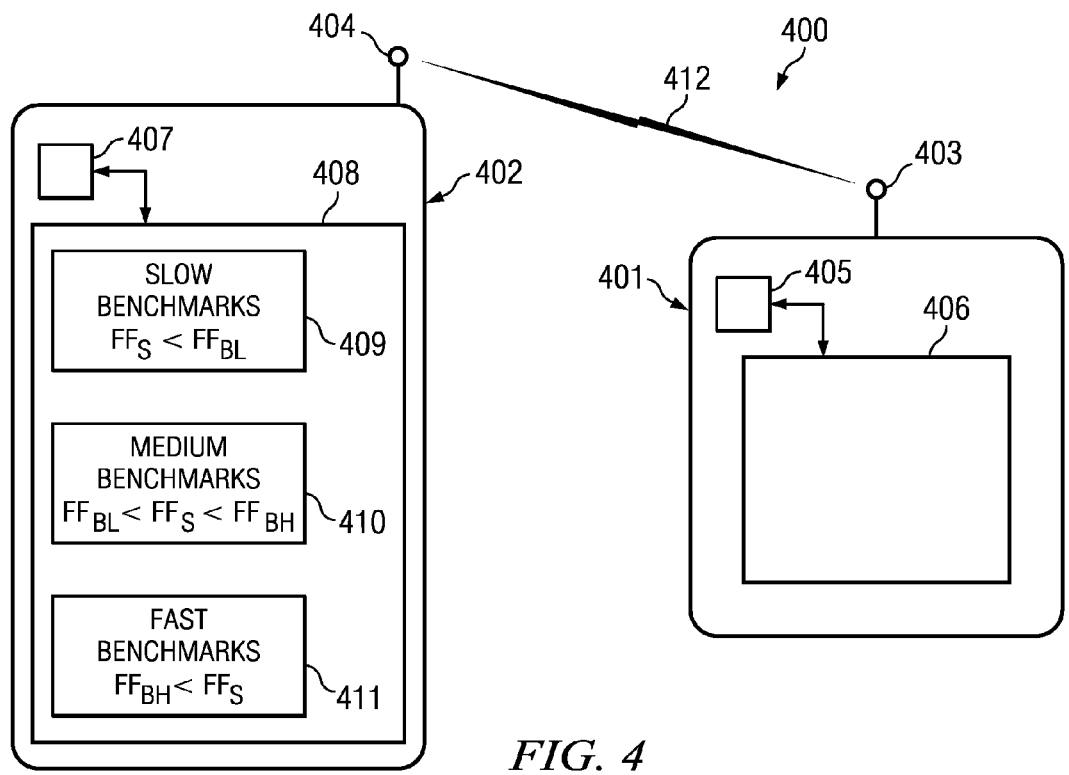
FIG. 4 is an illustration of a system for determining the speed of a wireless device based upon the characteristics of measured CQI data; and, FIG. 5 is an illustration a method for determining the speed of a wireless device based upon the characteristics of measured CQI data.

FIG. 4 is an illustration of a system 400 for determining the speed of a wireless device based upon the characteristics of measured CQI data. A wireless device 401 may be coupled to a wireless device antenna 403. A base station 402 may be coupled to a base station antenna 404. Wireless device antenna 403 and base station antenna 404 utilize a wireless signal 412 to communicate with each other. Wireless device 401 may comprise a processor 405 coupled to a memory 406. Base station 402 may comprise a processor 407 coupled to a memory 408. Memory 408 may comprise a slow-moving benchmark 409, a medium-moving benchmark 410, and a fast-moving benchmark 411.

Wireless device 401 and base station 402 may be configured to interpret and/or execute program instructions and/or process data. In certain embodiments, wireless device processor 405 or base station processor 407 may comprise, for example a microprocessor, microcontroller, digital signal processor (DSP), application specific integrated circuit (ASIC), or any other digital or analog circuitry configured to interpret and/or execute program instructions and/or process data. In some embodiments, wireless device processor 401 or base station processor 407 may interpret and/or execute program instructions and/or process data stored in wireless device memory 406 or wireless device memory 408. Wireless device memory 406 or wireless device memory 408 may include any system, device, or apparatus configured to hold and/or house one or more memory modules. Each memory module may include any system, device or apparatus configured to retain program instructions and/or data for a period of time (e.g., computer-readable media).

In operation, wireless device 401 and base station 402 communicate through wireless device antenna 403 and base station antenna 404. Wireless device 401 may be configured to determine the CQI data associated with the wireless signal 412 it is receiving through wireless device antenna 403. Information about wireless signal 412 may be stored in memory 406 and operated upon by processor 405, using instructions stored in memory 406. Wireless device 401 may be configured to take a certain number of samples of CQI data at certain frequencies associated with the wireless communications channels being utilized for communication. Wireless device 401 may be configured, according to a CQI update interval, to take and report CQI samples at a particular rate. Sampled CQI data may be transmitted by wireless device antenna 403 to base station antenna 404.

Base station 402 may receive the sampled CQI data from wireless device 401 through base station antenna 404. The sampled CQI data may be analyzed to determine CQI fast fading characteristics. CQI fast fading characteristics may comprise any evaluation by which the fast fading of the sampled wireless signal may be characterized. The CQI fast fading characteristics may provide information on the relative smoothness or erratic nature of the sampled wireless signal, as would be found in a wireless signal with fast fading. The CQI fast fading characteristics may be based upon the fluctuation frequency of the CQI data, and/or upon the fluctuation amplitude of the CQI data. In one embodiment, the CQI fast fading characteristics comprise the statistical standard deviation of the sampled CQI data. In another embodiment, the CQI fast fading characteristics comprise the average peak-to-valley amplitude measurement of the sampled CQI data. In another embodiment, the CQI fast fading characteristics comprise the number of peaks in the sampled CQI data. Multiple CQI data samples may be aggregated to determine CQI fast fading characteristics. A statistically sufficient number of CQI data samples should be collected to ensure a statistically accurate fast fading characteristic. In one embodiment, at least 1,000 CQI data samples are taken. However, if too many samples are taken, a change in speed may be missed as a wireless device may accelerate quickly. For example, a wireless device in an automobile may go from stop to 100 kilometers per hour in a few seconds. In one embodiment, CQI data is sampled for five to ten seconds.

CQI fast fading characteristics may be compared against benchmarks 409, 410, 411 representing characteristics common to slow-moving, medium-moving, and fast moving wireless devices, respectively. Benchmarks 409, 410, 411 may be pre-determined according to experimental data, wherein CQI data is collected and characterized for a wireless device travelling at a known speed. Benchmarks 409, 410, 411 may be determined according to simulated data, wherein data is generated and characterized for a wireless device travelling at a simulated speed. Benchmarks 409, 410, 411 may depend upon a particular type of terrain or geography, or may depend upon a specific physical location. Benchmarks 409, 410, 411 may comprise a range of values, wherein the range of values represents fast fading characteristics associated with a speed of wireless device. In some embodiments, more or less benchmarks may be used. In one embodiment, the sampled data is pattern-matched against CQI benchmarks 409, 410, 411, which in turn comprise patterns of fast fading data. In one embodiment, based upon the comparison of CQI fast fading characteristics against benchmarks 409, 410, 411, the speed of the wireless device may be determined. In one embodiment, the determined speed is qualitative in nature. In one embodiment, the determined speed is a range of speeds, wherein the limits of the wireless device speed range correspond to the benchmark value limits.

In one embodiment, benchmark 409 may comprise a lower limit of fast fading, $FF_{BL}$, corresponding to the standard deviation of the fast fading of a benchmark wireless device travelling at 30 kilometers per hour. If a fast fading characteristic $FF_S$, comprising the standard deviation calculated from sampled CQI data from a wireless device, is less than $FF_{BL}$, then the wireless device is travelling at a slow speed. Such a wireless device may produce CQI data such as those illustrated in FIG. 3a. Benchmark 410 may comprise the lower limit of fast fading, $FF_{BL}$, and an upper limit of fast fading, $FF_{BH}$, corresponding to the standard deviation of the fast fading of a benchmark wireless device travelling 90 kilometers per hour. If the fast fading characteristic $FF_S$, comprising the standard deviation calculated from sampled CQI data from a wireless device, is greater than $FF_{BL}$ but more than $FF_{HL}$, the wireless device is travelling at a medium speed. Such a wireless device may produce CQI data such as those illustrated in FIG. 3b. Benchmark 411 may comprise the upper limit of fast fading, $FF_{HL}$. If a fast fading characteristic $FF_S$, comprising the standard deviation calculated from sampled CQI data from a wireless device, is greater than $FF_{HL}$, then the wireless device is travelling at a high speed. Such a wireless device may produce CQI data such as those illustrated in FIG. 3c.

Speed benchmarks may be selected according to the particular need for speed information. In an example embodiment, an application needing to know only whether a wireless device is "fast" or "slow" may select a fast fading benchmark associated with a particular threshold speed, then compare fast fading characteristics of sample CQI data against the single benchmark. Such an embodiment may be used where an approach to wireless communication becomes appropriate for a wireless device according to a particular speed.

In one embodiment, different techniques and protocols of wireless communications are appropriate for different speeds of wireless devices. One technique may be available for a range of speeds, while a disparate technique may be available for another range of speeds. The two ranges may overlap, wherein for the intersection of the two ranges, either technique may be appropriately used.

In one embodiment, wherein base station 402 is represented by the base station 101 of FIG. 1, and wireless device 401 is represented by the wireless device 104 of FIG. 1, base station 101 will determine, in conjunction with base stations 102, 103 within the range of mobile device 104, which of the base stations 101, 102, 103 should be connected to mobile device 104, based upon the speed of mobile device 104. The wireless communications network 100 may comprise a hierarchical cell structure. The base station 101 connected to wireless device 104 may be reselected to another base station 102, 103 based upon the capacity needs, status, location of the wireless device 104, or upon the aggregation of the similar needs of additional wireless devices (not shown) in the wireless network. In one embodiment, a slow moving wireless device 104 may be reassigned from base station 101 with a larger coverage area 105 to a base station 103 with a smaller coverage area 107. A fast moving wireless device 104 may be reassigned from base station 103 with a small coverage area 107 to a base station 101 with a larger coverage area 105. In one embodiment, a priority is assigned to a base station as a means of selecting which base station, out of one or more possible base stations, will be connected to the wireless device. In one embodiment, a base station 101 with a large coverage area 105 may be assigned a higher priority for a fast moving wireless device 104. In one embodiment, a base station 103 with a smaller coverage area 107 may be assigned a higher priority for a slow moving wireless device 104.

In one embodiment, base station 402 may employ frequency diversity scheduling or frequency selective scheduling to communicate with wireless device 401. For a slow-moving wireless device 401, base station 402 may employ frequency selective scheduling. For a fast-moving wireless device 401, base station 402 may employ frequency diversity scheduling. For a medium-moving wireless device 401, base station 402 may employ either frequency diversity scheduling or frequency selective scheduling. In such an embodiment, either technique may be selected according to factors other than wireless device 401 speed, such as capacity, throughput, and the needs of other wireless devices needing to access the network. Benchmarks should be chosen such that the benchmarks approximate the threshold speeds at which frequency selective scheduling is appropriate and not appropriate, and the threshold speeds at which frequency diversity scheduling is appropriate and not appropriate.

Figure 5:
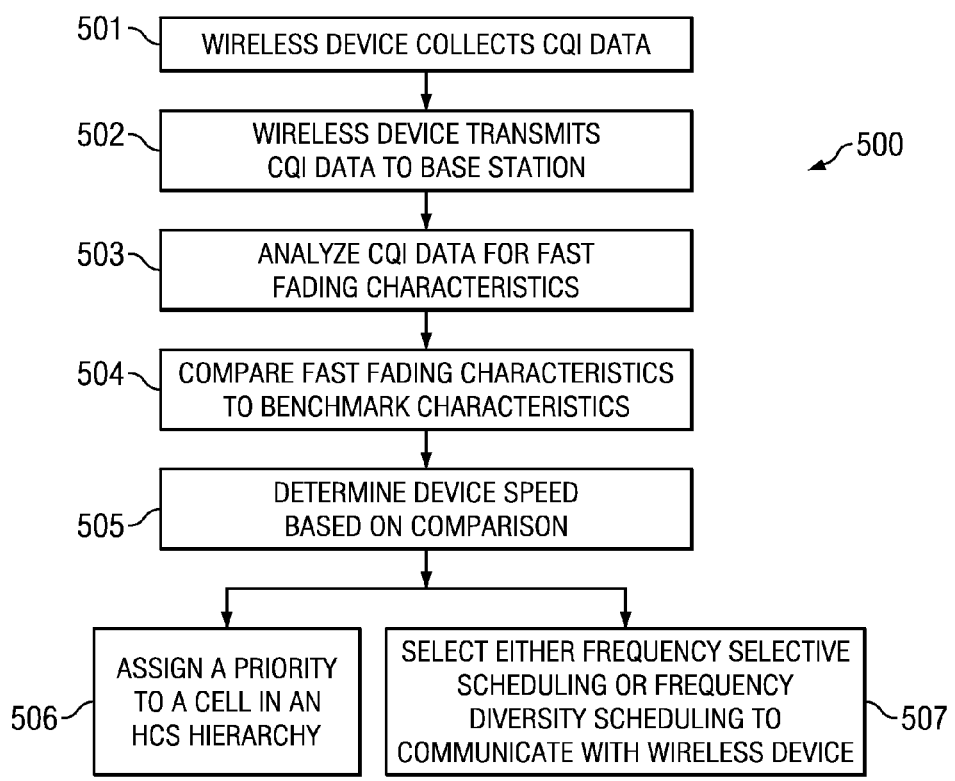

FIG. 5 is an illustration a method 500 for determining the speed of a wireless device based upon the characteristics of measured CQI data. In step 501, CQI data may be collected by a wireless device. In step 502, the wireless device may transmit the sampled CQI data to a base station. In step 503, the CQI data may be analyzed to determine the fast fading characteristics of the sampled CQI data. In step 504, the fast fading characteristics of the CQI sample data may be compared to benchmark fast fading characteristics associated with different speeds of wireless devices. The fast fading characteristics of the sampled CQI data may be compared with benchmark fast fading characteristics that are associated with a slow-moving, medium-moving, or fast-moving wireless device. In one embodiment, the benchmark fast fading characteristics of step 504 comprise a range of possible values. If the fast fading characteristics of the sampled CQI data are within the range of the benchmark fast fading characteristics, then the sampled CQI data matches the benchmark. In another embodiment, the benchmark fast fading characteristics of step 504 comprise a threshold value, above or below which the sampled CQI data matches the benchmark.

In Step 505, the speed of the wireless device may be determined based on the comparisons in Step 504. In one embodiment, the determined speed may be an estimation. In one embodiment, the estimation of the speed of the wireless device may be qualitative, with possible results that the device is slow-moving, medium-moving, or fast-moving. In one embodiment, the estimation of the speed may have possible results that the device is slow-moving or fast-moving.

Optionally, additional steps may be employed to make use of the determined speed of the wireless device from step 505. In step 506, the speed of the wireless device may be used to select which base station will be connected to the wireless device. In one embodiment, the base station is selected as one node in an hierarchical cell structure. In one embodiment, a slow moving wireless device may be reassigned from base station with a larger coverage area to a base station with a smaller coverage area. A fast moving wireless device may be reassigned from base station with a small coverage area to a base station with a larger coverage area. In one embodiment, a priority is assigned to a base station as a means of selecting which base station, out of one or more possible base stations, will be connected to the wireless device. In one embodiment, a higher priority is assigned to a base station with a larger coverage area for a fast-moving wireless device. In one embodiment, a higher priority is assigned to a base station with a smaller coverage area for a slow-moving wireless device.

In step 507, the speed of the wireless device may be used to select either frequency selective scheduling or frequency diversity scheduling as a protocol for the base station and the wireless device to communicate. In one embodiment, frequency selective scheduling is selected if the wireless device speed is slow. In one embodiment, frequency selective scheduling is selected if the wireless device speed is slow or medium. In one embodiment, frequency diversity scheduling is selected if the wireless device speed is fast. In one embodiment, frequency diversity scheduling is selected if the wireless device speed is medium or fast.

Method 500 may be implemented using the system of FIG. 4, or any other system operable to implement method 500. In certain embodiments, method 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method of determining the speed of a wireless device, comprising:
   receiving channel quality indicator data at a base station from a wireless device, the channel quality indicator data indicative of the signal quality at the wireless device;
   determining fast fading characteristics of the received channel quality indicator data at the base station;
   comparing the fast fading characteristics of the received channel quality indicator data against benchmark channel quality indicator data, the benchmark data comprising fast fading characteristics at the base station;
   determining the speed of the wireless device based on the comparison at the base station; and
   utilizing either frequency selective scheduling or frequency diversity scheduling based upon the determined speed of the wireless device.

2. The method of claim 1, wherein
   the base station is configured to communicate in a Lone Term Evolution the LTE network with the wireless device in the LTE network.

3. The method according to claim 1, wherein the benchmark data comprises fluctuation frequency and fluctuation amplitude of channel quality indicator data.

4. The method according to claim 3, wherein comparing the channel quality indicator data against benchmark channel quality indicator data further comprises the steps of:
   correlating a greater fluctuation frequency or fluctuation amplitude with a lower speed; and
   correlating a lower fluctuation frequency or fluctuation amplitude with a higher speed.

5. The method according to claim 4, wherein the benchmark data comprises a plurality of ranges of fluctuation frequency or fluctuation amplitude data, each of the plurality of ranges of fluctuation frequency or fluctuation amplitude data corresponding to different speeds of a wireless device.

6. The method according to claim 5, wherein the benchmark data comprises:
   a first range of fluctuation frequency or fluctuation amplitude data, the first range of fluctuation frequency or fluctuation amplitude data corresponding to a slow-moving mobile device; and;
   a second range of fluctuation frequency or fluctuation amplitude, the second range of fluctuation frequency or fluctuation amplitude data corresponding to a fast-moving mobile device.

7. The method according to claim 6, wherein the benchmark data further comprises a third range of fluctuation frequency or fluctuation amplitude, the third range of fluctuation frequency or fluctuation amplitude data including an overlap between the first and second ranges of fluctuation frequency or fluctuation amplitude and corresponding to a medium-speed-moving mobile device.

8. The method according to claim 1, wherein frequency selective scheduling is utilized if the channel quality indicator data corresponds to a slow-moving mobile device.

9. The method according to claim 1, wherein frequency diversity scheduling is utilized if the channel quality indicator data corresponds to a fast-moving mobile device.

10. A method of determining the speed of a wireless device, comprising:
    receiving channel quality indicator data at a base station from a wireless device, the channel quality indicator data indicative of the signal quality at the wireless device;
    determining fast fading characteristics of the received channel quality indicator data at the base station;
    comparing the fast fading characteristics of the received channel quality indicator data against benchmark channel quality indicator data, the benchmark data comprising fast fading characteristics at the base station;
    determining the speed of the wireless device based on the comparison at the base station; and
    assigning a priority to a coverage cell of a hierarchical cell structure based upon the determined speed of the wireless device.

11. An article of manufacture comprising:
    a computer readable medium; and
    computer-executable instructions carried on the computer readable medium, the instructions readable by a processor, the instructions, when read and executed, for causing the processor to:
    receive channel quality indicator data at a base station from a wireless device;
    determine fast fading characteristics of the received channel quality indicator data at the base station;
    compare the fast fading characteristics of the received channel quality indicator data against benchmark data, the benchmark data comprising fast fading characteristics at the base station;
    determine the speed of the wireless device based on the comparison at the base station; and
    utilize either frequency selective scheduling or frequency diversity scheduling based upon the determined speed of the wireless device.

12. The article according to claim 11, wherein
    the base station is configured to communicate in a Long Term Evolution (LTE) network from the wireless device in the LTE network.

13. The article according to claim 11, wherein the benchmark data comprises fluctuation frequency and fluctuation amplitude of channel quality indicator data.

14. The article according to claim 13, wherein comparing the channel quality indicator data from the one or more wireless devices against one or more benchmark data further comprises:
    correlating a greater fluctuation frequency or fluctuation amplitude with a lower speed; and
    correlating a lower fluctuation frequency or fluctuation amplitude with a higher speed.

15. The article according to claim 14, wherein the benchmark data comprises a plurality of ranges of fluctuation frequency or fluctuation amplitude data, each of the plurality of ranges of fluctuation frequency or fluctuation amplitude data corresponding to different speeds of a wireless device.

16. The article according to claim 15, wherein the benchmark data comprises:
    a first range of fluctuation frequency or fluctuation amplitude data, the first range of fluctuation frequency or fluctuation amplitude data corresponding to a slow-moving mobile device; and;
    a second range of fluctuation frequency or fluctuation amplitude, the second range of fluctuation frequency or fluctuation amplitude data corresponding to a fast-moving mobile device.

17. The article according to claim 16, wherein the benchmark data further comprises a third range of fluctuation frequency or fluctuation amplitude, the third range of fluctuation frequency or fluctuation amplitude data including an overlap between the first and second ranges of fluctuation frequency or fluctuation amplitude and corresponding to a medium-speed-moving mobile device.

18. The article according to claim 11, wherein frequency selective scheduling is utilized if the channel quality indicator data corresponds to a slow-moving mobile device.

19. The article according to claim 11, wherein frequency diversity scheduling is utilized if the channel quality indicator data corresponds to a fast-moving mobile device.

20. An article of manufacture comprising:
a computer readable medium; and
computer-executable instructions carried on the computer readable medium, the instructions readable by a processor, the instructions, when read and executed, for causing the processor to:
receive channel quality indicator data at a base station from a wireless device;
determine fast fading characteristics of the received channel quality indicator data at the base station;
compare the fast fading characteristics of the received channel quality indicator data against benchmark data, the benchmark data comprising fast fading characteristics at the base station;
determine the speed of the wireless device based on the comparison at the base station; and
assign a priority to a coverage cell of a hierarchical cell structure based upon the determined speed of the wireless device.

21. A wireless device network base station configured to:
receive a transmission including a channel quality indicator data from a wireless device;
determine fast fading characteristics of the received channel quality indicator data;
compare the fast fading characteristics of the received channel quality indicator data against benchmark data, the benchmark data comprising fast fading characteristics;
determine the speed of the wireless device based on the comparison; and
optionally use frequency selective scheduling or frequency diversity scheduling based upon the determined speed of the wireless device.

22. The wireless device network base station according to claim 21, wherein the wireless device network base station is configured to communicate in a Long Term Evolution (LTE) network.

23. The wireless device network base station according to claim 21, wherein:
the benchmark data comprise fluctuation frequency and fluctuation amplitude of channel quality indicator data.

24. The wireless device network base station according to claim 23 further configured to:
correlate a greater fluctuation frequency or fluctuation amplitude with a lower speed; and
correlate a lower fluctuation frequency or fluctuation amplitude with a higher speed.

25. The wireless device network base station according to claim 24, wherein the benchmark data comprises a plurality of ranges of fluctuation frequency or fluctuation amplitude data, each of the plurality of ranges of fluctuation frequency or fluctuation amplitude data corresponding to different speeds of a wireless device.

26. The wireless device network base station according to claim 25, wherein the benchmark data comprises:
a first range of fluctuation frequency or fluctuation amplitude data, the first range of fluctuation frequency or fluctuation amplitude data corresponding to a slow-moving mobile device; and;
a second range of fluctuation frequency or fluctuation amplitude, the second range of fluctuation frequency or fluctuation amplitude data corresponding to a fast-moving mobile device.

27. The wireless device network base station according to claim 26, wherein the benchmark data further comprises a third range of fluctuation frequency or fluctuation amplitude, the third range of fluctuation frequency or fluctuation amplitude data:
comprising an overlap between the first and second ranges of fluctuation frequency or fluctuation amplitude; and,
corresponding to a medium-speed-moving mobile device.

28. The wireless device network base station according to claim 21 wherein frequency selective scheduling is utilized if the channel quality indicator data corresponds to a slow-moving mobile device.

29. The wireless device network base station according to claim 21, wherein frequency diversity scheduling is utilized if the channel quality indicator data corresponds to a fast-moving mobile device.

30. A wireless device network base station configured to:
receive a transmission including a channel quality indicator data from a wireless device;
determine fast fading characteristics of the received channel quality indicator data;
compare the fast fading characteristics of the received channel quality indicator data against benchmark data, the benchmark data comprising fast fading characteristics;
determine the speed of the wireless device based on the comparison; and
assign a priority to a coverage cell of a hierarchical cell structure based upon the determined speed of the wireless device.

* * * * *

UNITED STATES PATENT AND TRADEMARK OFFICE
CERTIFICATE OF CORRECTION

PATENT NO. : 8,862,133 B2  
APPLICATION NO. : 12/622146  
DATED : October 14, 2014  
INVENTOR(S) : Rui Chu Chang Page 1 of 1

It is certified that error appears in the above-identified patent and that said Letters Patent is hereby corrected as shown below:

In the claims:

Column 9, Line 21: After "communicate in a" delete "Lone" and insert --Long--.

Column 9, Line 22: After "Term Evolution" and before "network" delete "the LTE".

Signed and Sealed this
Sixth Day of January, 2015

Michelle K. Lee
*Deputy Director of the United States Patent and Trademark Office*